United States Patent Office 2,737,477
Patented Mar. 6, 1956

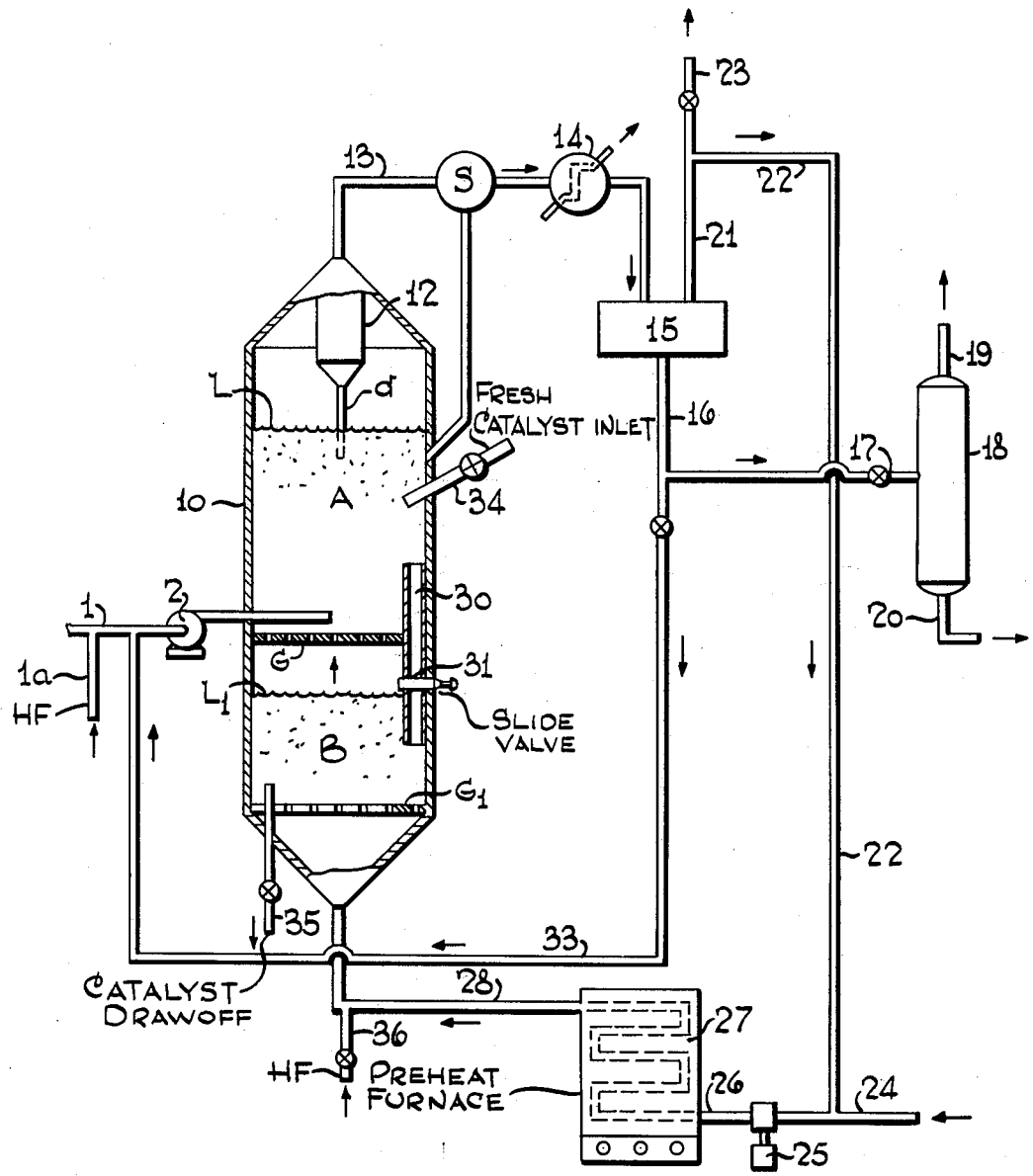

2,737,477
HYDROFORMING

Charles E. Hemminger, Westfield, N. J., assignor to Esso Research and Engineering Company, a corporation of Delaware Application April 27, 1951, Serial No. 223,202

5 Claims. (Cl. 196—50)

The novel features of the present invention are fully disclosed in the following specification and claims, read in connection with the accompanying drawing.

Heretofore and prior to the present invention, it was a matter of record and commercial practice to hydroform naphthenic naphtha to increase the aromaticity thereof. Hydroforming is an operation in which a naphthene-containing hydrocarbon oil is contacted at elevated temperatures and pressures with a solid catalytic material. From 5,000–10,000 standard cubic feet of hydrogen are fed to the contacting zone with each barrel of oil. The process usually results in a net hydrogen production. The catalyst usually consisted of a difficultly reducible oxide such as a metal oxide of group VI of the periodic system (e. g. $MoO_3$) carried on a suitable support or spacing agent, such as active alumina (e. g. alumina gel, or a low soda crystalline compound). Another type of catalyst heretofore disclosed in the prior art is one containing platinum or palladium carried on alumina or alumina and silica, which carrier had been treated with HF. This latter operation as carried out in prior practice was a high pressure process, a pressure of 700–900 lbs. per sq. in. being maintained in the hydroforming zone.

The present invention relates to a method of hydroforming naphthas employing a platinum group metal carried on a spacing agent such as active alumina preferably treated with HF. Briefly, according to the present invention, the pressures employed during the hydroforming reaction are substantially lower than those heretofore employed in this type of operation. By so operating important savings in gas compression costs are attainable. Another important advantage of the present invention is that less hydrogen is fed to the reaction zone per barrel of oil. This low hydrogen to oil ratio results in a hydroformate product of higher octane rating. This is important for the "recycled" hydrogen fed to the reaction must be heated to around 1000° F. or higher. There is an important saving where, as here, the amount of hydrogen reheated is substantially reduced. Furthermore, the present invention relates to the so-called regeneration type of operation in which conditions existing in the reaction zone are such as to cause the deposition of carbonaceous matter on the catalyst, deactivating the same, and requiring regeneration of the catalyst to restore its activity. According to the present invention, the fouled catalyst is regenerated with hydrogen under conditions more fully described hereinafter. The present invention contemplates a cyclic operation employing a plurality of zones containing fixed beds of catalysts which zones are alternately employed in the productive or on-stream phase of the cyclic process while the catalyst in another zone undergoes regeneration with hydrogen to restore its activity.

The main object of the present invention, therefore, is to provide a hydroforming process which is more efficient and cheaper than those heretofore employed.

Another object of the present invention is to provide a hydroforming process utilizing a fixed bed or beds of platinum- or palladium-containing catalyst carried on a suitable support, mainly characterized in that the hydroforming operation is conducted at pressures substantially lower than those previously utilized, thus effecting important economies in the operation.

Another object of the present invention is to conduct the hydroforming operation in the presence of a fixed bed of platinum group metal catalyst under operating conditions such as to produce a product of higher octane level than that formerly attainable in similar processes.

Another object of the present invention is to carry out the hydroforming operation in the presence of a platinum group metal-containing catalyst under conditions such that a lesser amount of the feed is converted to butane and similar normally gaseous hydrocarbons.

Another object of the present invention effecting important economies involves carrying out the hydroforming operation so that a lesser amount of added hydrogen is fed to the reaction zone per barrel of oil than formerly required in hydroforming operations using platinum catalysts.

Another object of the present invention is to carry out the hydroforming operations under conditions such that high yields of higher octane products are obtainable than in prior practice.

In the accompanying drawing, there is shown, schematically, in Figure 1, the essential apparatus in which a preferred modification of the present invention may be carried into effect and in Figure 2 there is depicted a modification of the apparatus illustrated in Figure 1 in which a plurality of reactors operating in series is shown.

Referring in detail to Figure 1, vessels 1 and 2 are reaction vessels containing fixed beds of catalyst C and C', respectively, in a system about to be described, which involves a cyclic operation in which the said vessels or cases 1 and 2 are alternately employed in the "on-stream" or productive phase of the operation while the catalyst in the other vessel or case is undergoing regeneration. Assuming that vessel 1 is in the on-stream operation, the method of operation will now be described in detail. Naphthene-containing hydrocarbon oil feed enters the present system through line 10 and is thereafter forced through heating means 11, such as a fired coil, where the said oil is heated to a temperature of about 900°–1025°–1100° F. and thereafter the preheated oil is withdrawn through line 12 and passed via line 13 through valve V, line 14 and 14a into the top of reactor 1. The reactor 1 contains a body of the said catalyst C supported on a suitable foraminous member G which may be a screen or grate. The catalyst may be in the form of pills, pellets, granules, or other shaped bodies and may have a diameter and thickness of suitable size, say, approximately 3/16". Although hydrogen is fed with the feed to the reaction zone, in starting operations, no hydrogen is present in the original feed, for after the operation has been on-stream for a relatively short period of time, gases containing high percentages of hydrogen are formed. As will be more fully explained hereinafter, the hydrogen-containing gas, hereafter sometimes called hydrogen, is separated from the hydroformed product in a separator S. This hydrogen from separator S is withdrawn through line 15 and conducted through a compressor 16 and thence conducted via line 17 into a hydrogen preheating furnace 18. A portion of this recycled hydrogen may, however, be continuously rejected from the system through line 19. The hydrogen in furnace 18 is heated to a temperature at least as high as the said oil feed but preferably from about 1000°–1100° F. for normal operations. It will be understood, however, that this hydrogen-containing gas may be preheated to temperatures as high as 1400° F. The preheated hydrogen is withdrawn from the furnace 18 through lines 20 and 21 and passed through a valve $V_1$ into line 14 where it admixes with the preheated feed and passes with the latter via 14a into the top of reactor 1. Under conditions of temperature and pressure and contact time more fully set forth hereinafter, the desired conversion takes place in reactor 1 and the crude hydroformate is withdrawn from reactor 1 via line 22a, thence passes through line 22, through valve $V_3$, then through lines 23 and 24, then through a condenser 25, and then to the separator S. The crude product in separator S is separated into a hydrogen-containing gas which is taken overhead via line 15 as previously mentioned while the crude hydroformate is withdrawn from the separator S through line 27 and delivered to a purification system of conventional design (not shown) in order to recover the desired product. Since the method of subjecting crude hydroformate to fractional distillation and other purification steps is well known in the prior art, it will not be necessary to describe it in words herein, or to illustrate it in the present drawing.

The recycled gas in line 15 contains 85–95% hydrogen, the rest being hydrocarbons, predominantly normally gaseous hydrocarbons.

The operation just now described where the assumption was made that the vessel 1 was employed in the on-stream phase was continued for a time period of from 0.5–4 hours, preferably, for a period of 1 hour, whereupon in a manner about to be described, the reactor 2 which had meanwhile been in the regeneration phase of the cyclic process, is brought into the productive phase, while the catalyst in reactor 1 is then subjected to regeneration in a manner about to be described. In spite of the fact that hydrogen is fed with the oil to the reaction zone, and this hydrogen tends to repress carbon formation on the catalyst, nevertheless, carbon does form on the catalyst, impairing the activity of the catalyst and, therefore, it is necessary to regenerate the same.

In regenerating the catalyst, the first step is to discontinue the oil feed to reactor 1 by closing valve V, and directing the oil stream to line 14' by opening valve V'. Thereafter the oil flows into the top of reactor 2 via line 14a'. As before, hydrogen from preheater furnace 18 is directed from line 20 into lines 21' and 14', and thereafter into reactor 2, via 14a' by opening $V_1'$. Under conditions the same as existing previously in reactor 1 and using the same catalyst, the feed undergoes conversion and product is withdrawn from the bottom of the reactor 2 via line 22a' and 22' by closing valve $V_5'$ and opening $V_3'$, whence the product passes via line 23' to line 24, through cooler 25, and line 26 into separator S where it is separated into a hydrogen-containing gas fraction and a raw hydroformed product in the same manner as the product from reactor 1, previously described.

Referring to the regeneration of the catalyst in reactor 1 which, as explained, takes place while the catalyst in reactor 2 is in the on-stream phase, the catalyst is regenerated with a portion of the hydrogen recovered from separator S via line 15. This hydrogen-containing gas is heated, as previously stated, in furnace 18, thence is directed via lines 20, 21 and opened valve $V_1$ into line 14, and thereafter into the top of reactor 1 via line 14a where it is forced downwardly therethrough under conditions of temperature and pressure and feed rates more fully described hereinafter. The effect of the hydrogen is to remove carbonaceous and sulfur-containing deposits from the catalyst by converting them into volatile materials. The fumes resulting from this regeneration are removed from the bottom of reactor 1 via lines 22a and 22.

These fumes are recycled to reactors 1 and 2 as follows: First, valve $V_3$ in line 22 is closed, and the fumes or gases in said line 22 are directed through opened valve $V_5$, line 30, opened valve $V_{11}$, the blower 31, line 32, opened valve $V_4$, lines 14 and 14a. Meanwhile, through opened valve $V_4'$ a portion of these fumes or gases pass into lines 14 and 14a' where they mix with the oil and pass into the reactor 2.

The hydrogen-containing gas flows downwardly, as indicated, through the catalyst in reactor 1 reacting with the deposits thereon and converting them to volatile materials which may be withdrawn through line 22a.

It is to be noted that during the on-stream period the oil feed was downflow and the hydrogen during the early regeneration phase was also downflow. This phase of the hydrogen regeneration is continued for approximately 45% of the total regeneration period, which time period is substantially equal to the reaction period in this modification.

Following the first phase of the regeneration, the hydrogen flow is reversed through vessel 1 so that the hydrogen now flows upwardly through the vessel in order to afford improved and complete gas-solids contact and substantially to homogenize temperature conditions throughout the reaction vessel. This reversal of the hydrogen gas stream flow is accomplished by manipulating the valves shown as follows: It is first pointed out that the hydrogen gas passing through reactor 1 in an upwardly direction will pass through the blower 31 at a temperature below that of the gas in line 21, for gas passing through the blower at a high temperature would injure the blower. Therefore, valve $V_1$ in line 21 is closed and valve $V_4'$ in line 14 is closed so that the circulation of hydrogen is from line 14 through opened valve $V_4$, line 32, opened valve $V_{10}$ in line 30a, thence through line 30b to the inlet side of blower 31, from blower 31 through line 30c (valve $V_{13}$ being closed), thence through opened valve $V_{14}$ into line 22, thence through opened valve $V_5$ in said line 22, thence through line 22a, thence upwardly through the reactor 1, thence from the reactor through line 14a and the cycle repeated from line 14, as previously explained. If necessary, valve $V_1$ may be cracked to admit a small amount of hot hydrogen, and similarly, valve $V_4'$ may be opened at least partially to permit flow of hydrogen into reactor 2. As in the previous stage of the regeneration phase, this phase continues for about 45% of the regeneration period.

The regeneration involves a final tempering of the catalyst and this is accomplished by forcing a cool hydrogen gas through the catalyst bed in reactor 1. This latter hydrogen is directed from line 17 through lines 33 and 34, valve $V_7$, thereafter through lines 14 and 14a into the top of reactor 1 wherein it is forced through the catalyst during the remainder of the regeneration period. Of course, during this phase, the valve V in oil line 13 and valve $V_1$ in hot hydrogen line 21 are closing. This cooled hydrogen circulates through the same pipes and valves in passing through reactor 1 as did the hydrogen during the first phase of the regeneration, and a portion of this hydrogen may be directed into line 14a by opening valve $V_4'$. This final phase of the regeneration is continued for the remaining 10% of the regeneration period, whereupon the reactor 1 is placed back on-stream and the catalyst in reactor 2 is subjected to regeneration by manipulation of the valve shown so as to cause hot hydrogen to pass downwardly through the catalyst for a time period substantially equal to 45% of the total regeneration period, thence in the reverse direction of the catalyst for another period of time substantially equal to the first phase, and finally cool hydrogen is passed through the catalyst in a downwardly direction for about 10% of the total regeneration time period.

The gas space velocity during regeneration obtained by recycle pump 31 is in the order of 3000–7000 vol. of gas per hour per volume of catalyst, the gas volumes measured at standard conditions. By this complete regeneration operation, the catalyst is purified and conditioned and the catalyst in the top portion of the reactor is cooled to reaction temperature. The catalyst is then ready for return to the productive phase.

It is within the compass of this invention to carry out the regeneration at a pressure 100–200 lbs. per sq. in. higher than in the on-stream zone.

To summarize the hydrogen regeneration operation, each reactor is subjected to hydrogen recycle gas regeneration for a period of time approximately or substantially equal to the reaction time period, usually an hour. For 45% of the regeneration period, the recycle gas flows downwardly and, since the recycle gas is heated to about 1100° F., the catalyst is heated to about 100° F. hotter than the reaction temperature. The effluent gas from the regeneration is recycled in part to the reactor on regeneration to increase the space velocity to preferably about 5000 C. F. (measured at standard conditions) per hour per cubic foot of catalyst. The remainder is diverted to the oil feed in the reactor receiving oil to increase the recycle gas to oil ratio therein. After completion of this downflow phase of the regeneration, the flow of the regeneration gas is reversed so as to give complete heating and cleaning of the catalyst. Again, the regeneration effluent gas is partly recycled to its inlet and the remainder goes with the oil feed to the reactor in the hydroforming phase. The final stage of the hydrogen regeneration is a short downflow regeneration, as in the case of the first downflow phase, except that cool or cold recycle hydrogen-containing gas is fed during this final phase of the regeneration. The reactor effluent gas is distributed as in the first phase.

Further to describe the invention, the following specific example is set forth:

*Example*

In a typical operation a West Texas virgin naphtha feed containing about 45 vol. percent naphthenes, and boiling within the range of from about 200°–300° F. is fed to the system. Simultaneously 3000 cubic feet of hydrogen-containing gas (measured at standard conditions) and containing 85–95% hydrogen are fed to the present system with each barrel of oil. The catalyst employed consists of 98.5 wt. percent alumina, 0.5 wt. percent platinum, 1.0 wt. percent HF. The oil was fed to the reaction zone at a rate of 2 volumes of oil per hour per volume of catalyst. The temperature maintained in the reaction zone averaged 900° F. The pressure maintained in the reaction zone was 225 lbs. per sq. in. In this example the reaction was conducted for a period of two hours before it was discontinued to regenerate the catalyst. The following results were obtained:

|  | Feed | Product |
|---|---|---|
| Gravity | 53 | 52 |
| Octane No. CFRR | 50 | 92 |
| Reid Vapor Pressure | 0.5 | 6.0 |
| Vol. Percent Naphthenes | 45 | 2 |
| Olefins | 0 | 1 |
| Paraffins | 42 | 35 |
| Aromatics | 10 | 62 |

The improvement in octane number and the increase in aromatic content is to be noted.

In one modification where seeking high yields of aromatics, the system is operated at pressures of around 100 lbs. per sq. in. in the case where a platinum group metal such as platinum itself is employed. However, if the catalyst is vanadium oxide promoted with an alkali metal containing substances, such as potassium, the system may be operated at high pressures.

In Figure 2, there is shown in fragment, the apparatus employed in a modification of the operation illustrated in Figure 1. In the interest of simplicity, only the reactors themselves are shown plus a reheat furnace disposed between the reactors. In other words, in Figure 2, 1a and 1b represent two reactors which operate in the on-stream phase in series with reheating between reactors. Thus, the feed of oil and hydrogen enters reactor 1a from line 114 and thereafter is forced through reactor 1a at an average temperature of 850° F. and a pressure of about say, 250 lbs. per sq. in. where the catalyst is the same as that set forth in the example above. The feed rate of oil and hydrogen-containing gas to reactor 1a is the same as that set forth in the example. The reaction products are withdrawn from reactor 1a through line 50 and thence pass through furnace 51 where the reactants are heated to a temperature of about 950° F. and thereafter pass via line 52 into the second reactor 1b. The feed rate of oil and hydrogen-containing gas is substantially the same through this reactor 1b as it is in reactor 1a, but the temperature in reactor 1b is higher than that in 1a, as indicated. The hydroformate product is withdrawn from reactor 1b through line 122b and after separation of hydrogen for recycling and catalyst regeneration purposes, the hydroformate is refined and purified in apparatus not shown.

When the catalyst in reactors 1a and 1b becomes deactivated by deposition of coke or deposits thereon, hydrogen only is forced from line 114 through reactor 1a, lines 50, 51, 54, valve 55 being open, and line 52 into the top of reactor 1b. Valves 56 and 57 are in closed position. The hydrogen serves to restore the catalyst activity in a manner previously explained.

Meanwhile, heated oil and hydrogen in line 114' are charged to reactor 2a, thence pass via line 50' and valve 58 into furnace 51, where they are reheated, thence pass from the furnace 51, through valve 58 into line 52' and then through reactor 2b. The product is withdrawn through line 122b'. At the end of the on-stream phase, and during the regeneration phase, hydrogen from 114' is forced through 2a, line 50, line 54', valve 55', and line 52', reactor 2b. The fumes are withdrawn through line 122a.

Other than the change in temperature in the reactors in this modification, the conditions and results are generally similar to those obtained with the single reactor shown in Fig. 1 on processing period. The advantage of this modification lies in decreasing the naphtha temperature in the preheat (corresponding to 11 in Fig. 1) furnace (see Fig. 1) about 100° F., thus decreasing thermal cracking therein. In general, about 3% more aromatics on feed are obtained by this modification for the same liquid yield of hydroformate.

In this modification, also, as in the procedure described in connection with the regeneration of the catalyst in the modification illustrated in Fig. 1, the hydrogen used as regeneration gas first passes downwardly through the catalyst bed, thence in a second phase, passes upwardly therethrough and finally downwardly, the hydrogen being at a lower temperature (around 850°–900° F.) during this final portion of the regeneration period. It is as if the reactors and the reheat furnace between them were substituted for the reactors of Fig. 1, the piping, valve disposition, the preheating, the recovery and recycling equipment being otherwise the same in this modification as that of Fig. 1.

The fumes exiting from the catalyst in the regeneration phase (in both modifications illustrated in the drawing) may contain heavy hydrocarbons. The hydrogen effluent from the regeneration phase fed to a reactor in the on-stream phase may and usually does contain heavy hydrocarbons, and these hydrocarbons may cause deposition of carbonaceous material on the catalyst in the reaction zone, thus lowering its activity. To prevent this happening, the effluent from the regeneration phase may be contacted with an adsorptive material in the form of solid pellets or granules in a fixed bed or in a fluidized bed of finely divided adsorptive material in order to remove the said heavy hydrocarbons from the hydrogen-containing gas. Any one of several adsorptive materials may be used, for example, activated char, silica gel, alumina gel, etc. In the case where activated char is employed, the same may be regenerated to remove adsorbed heavy hydrocarbons by treatment with steam at a temperature of, say 1200° F. or higher. If activated char is used as the adsorbent to remove the heavy hydrocarbons from gas, contacting temperatures between gas and adsorbent should be below about 500° F.

To review, the conditions giving good results in the instant process are as follows:

| | |
|---|---|
| Oil preheat temperature | 900°–1050° F. |
| Average temp. (in reaction zone) | 850°–950° F. |
| Pressure | 100–500 p. s. i. g. |
| Oil feed rate in standard cu. ft. | 1500–3000. |
| $H_2$ purity | 85–95%. |
| Oil feed rate | 1–3 vols. of oil/vol. of cat./hr. |
| Catalyst | Platinum 0.05–3.0 wgt. per cent, remainder active $Al_2O_3$ (may contain minor amount of HF, and a stabilizer such as $SiO_2$ gel). |

Numerous modifications of the invention described herein will suggest themselves to those familiar with the present art.

What is claimed is:

1. A cyclic process for hydroforming naphtha containing a substantial amount of naphthenes in a system including an on-stream productive phase and a catalyst regeneration phase, which comprises providing a plurality of fixed or stationary beds of catalyst containing a platinum group metal carried on an alumina support, employing at least one of said beds of catalyst in the productive phase while another of said beds of catalyst fouled during a previous on-stream phase is undergoing regeneration by treatment of the said catalyst with a hydrogen-containing gas, feeding said naphtha in vapor phase to a bed of catalyst in the on-stream phase, simultaneously feeding a hydrogen-containing gas to said bed of catalyst employed in the on-stream phase, maintaining temperatures of from 850 to 950° F. and pressures of from about 100–500 lbs. per square inch gauge in said bed of catalyst in the on-stream phase, permitting the reactants to undergo hydroforming in contact with the bed of catalyst in the on-stream phase for a sufficient period of time to effect the desired conversion and withdrawing from said bed of catalyst in the on-stream phase a hydroformate admixed with hydrogen simultaneously feeding a stream of a hydrogen-containing gas to a bed of catalyst in the on-regeneration phase and maintaining said bed at temperatures about 100° F. higher than those prevailing during the on-stream phase and under a pressure 100–200 p. s. i. g. higher than that prevailing in the reaction zone during the on-stream phase.

2. The method of claim 1 in which the on-stream phase and the regeneration phase are of substantially equal length as to time.

3. The method of claim 2 in which the hydrogen admixed with the hydroformate recovered from the on-stream phase is separated from the said hydroformate and recycled in part to the on-stream phase and in part to the regeneration phase.

4. The method of claim 1 in which the hydrogen fed to the regeneration phase is caused to flow through the bed of catalyst in the same direction as the hydrocarbon oil flowed in the previous on-stream phase, thereafer the flow of hydrogen through the bed of catalyst is reversed, and during the final stage of the regeneration phase, cold hydrogen is caused to flow through the bed of catalyst in the same direction as the oil during the said on-stream phase, whereby the bed of catalyst is conditioned as to temperature for the next succeeding on-stream phase.

5. The method of catalytically hydroforming a virgin naphtha containing a substantial amount of naphthenic hydrocarbons and periodically regenerating a catalyst employed in said hydroforming which comprises employing a cyclic operation in which a plurality of zones are utilized, at least one of which is on-stream while the catalyst in at least one other zone is undergoing regeneration, preheating said virgin naphtha as feed to a reaction zone on-stream to a temperature of about 900°–1050° F., simultaneously preheating a hydrogen-containing gas for feed to the said reaction zone, to a temperature at least as high as that to which the said virgin naphtha had been heated, feeding the preheated naphtha and the hydrogen-containing gas to said on-stream reaction zone, contacting the preheated naphtha and the preheated hydrogen in the said on-stream zone with a fixed bed of catalyst consisting essentially of a major proportion of alumina carrying from about 0.05–3.0% by weight and about 1.0 wt. percent HF both percentages based on the total weight of the catalyst of a platinum group metal, maintaining a temperature in said reaction zone of from about 850°–950° F., maintaining the pressure in said reaction zone of from about 100–500 lbs./sq. in. gauge, permitting the reactants to remain resident in the reaction zone for a sufficient period of time to effect a substantial conversion of the naphthenes to aromatics, withdrawing reaction products comprising hydroformate and hydrogen-containing gas from the on-stream reaction zone, separating the hydrogen-containing gas from said product and recycling at least a portion of said hydrogen-containing gas to the hydrogen preheating stage, recycling another portion of said hydrogen-containing gas to catalyst in a zone undergoing regeneration for the purpose of regenerating said catalyst by removing contaminants therefrom by treating said contaminated catalyst with said hydrogen-containing gas at a temperature between reaction temperature and about 100° F. higher, withdrawing effluent for a period of time at least as long as the reaction period from said regeneration zone and recycling at least a portion thereof to the regeneration zone inlet, feeding another portion of said effluent to the reaction zone, thereafter cooling said regenerated catalyst to prepare it for on-stream operation at reaction temperature by feeding thereto a cool hydrogen-containing gas.

References Cited in the file of this patent

UNITED STATES PATENTS

| | | |
|---|---|---|
| 2,270,715 | Layng et al. | Jan. 20, 1942 |
| 2,335,684 | Mayer | Nov. 30, 1943 |
| 2,472,844 | Munday et al. | June 14, 1949 |
| 2,479,110 | Haensel | Aug. 16, 1949 |
| 2,495,262 | Keith | Jan. 24, 1950 |
| 2,667,461 | Guyer et al. | Jan. 26, 1954 |

FOREIGN PATENTS

| | | |
|---|---|---|
| 577,008 | Great Britain | May 1, 1946 |